United States Patent

[11] 3,573,596

| [72] | Inventors | Zvi Kamil<br>Haifa;<br>Reuven Kaplan, Kiriat Haim, Israel |
|---|---|---|
| [21] | Appl. No. | 834,747 |
| [22] | Filed | June 19, 1969 |
| [45] | Patented | Apr. 6, 1971 |
| [73] | Assignee | State of Israel, Ministry of Defence<br>Hakiriya, Tel Aviv, Israel |

[54] ELECTRONIC CONVERTER FOR USE IN THE VOLTAGE TRANSFORMATION AND REGULATION OF A UNI-DIRECTIONAL VOLTAGE
10 Claims, 5 Drawing Figs.

[52] U.S. Cl. .................................................. 321/2, 321/18, 331/112
[51] Int. Cl. .................................................. H02m 3/22
[50] Field of Search .................................... 321/2, 18; 331/112

[56] References Cited
UNITED STATES PATENTS

| 3,206,694 | 9/1965 | Bates | 321/2X |
| 3,302,130 | 1/1967 | Minks | 321/2X |
| 3,400,319 | 9/1968 | Stich | 321/2 |
| 3,419,781 | 12/1968 | Jullien-Davin | 321/2 |
| 3,421,069 | 1/1969 | Minks | 321/2 |
| 3,435,320 | 3/1969 | Lee et al. | 331/112X |

*Primary Examiner*—William M. Shoop, Jr.
*Attorney*—Kirschstein, Kirschstein and Ottinger

ABSTRACT: An electronic converter for use in the voltage transformation and regulation of a unidirectional voltage having a controlled relaxation oscillator to which is coupled a power monostable circuit so as to be triggered thereby, an energy storage and voltage transformation transformer being coupled to the monostable circuit, the transformer having an output winding coupled to a load and a sensing winding tightly coupled to the output winding so as to sense the output voltage level. The sensing winding has coupled thereto a threshold detector which serves to transmit the excess energy stored in the transformer to a storage and filtering capacitor coupled to the detector via an amplifier which serves to switch the excess energy to the storage and filtering capacitor which is coupled to the relaxation oscillator so as to control its frequency and thereby maintain the output voltage at the required level.

Patented April 6, 1971  3,573,596

SIGNAL FLOW →
ENERGY FLOW ➡

INVENTORS
ZVI KAMIL
REUVEN KAPLAN
BY
*Kirschstein, Kirschstein, O'Brien & Frank*
ATTORNEYS INVENTORS
ZVI KAMIL
REUVEN KAPLAN
BY
Kirschstein, Kirschstein, Ottinger & Frank
ATTORNEYS Patented April 6, 1971 3,573,596

INVENTORS
ZVI KAMIL
REUVEN KAPLAN
BY

ATTORNEYS

ELECTRONIC CONVERTER FOR USE IN THE VOLTAGE TRANSFORMATION AND REGULATION OF A UNIDIRECTIONAL VOLTAGE

This invention relates to an electronic converter of a kind adapted for use in the voltage transformation and regulation of a unidirectional voltage. Such a converter will hereinafter be referred to as "a DC to DC converter of the kind specified."

The invention is particularly directed to the provision of a unidirectional high voltage source which can be readily constructed in a compact design of relatively light weight and having an output voltage which can be regulated to a very high degree of precision.

It has been previously proposed to use for this purpose an oscillator which is supplied with energy from a relatively low voltage source, the oscillator output being transformed and then rectified so as to produce the desired unidirectional voltage output. It has been found, in practice, however, that such known arrangements involve a considerable waste of power, either in the oscillator or in the rectifier or regulating circuits which had to be associated therewith. It is generally found that either the efficiency becomes low in the case of small loads, or it is very difficult to obtain precision performance in the case of a wide range of loads and input voltages.

It is an object of the present invention to provide a new and improved DC to DC converter of the kind specified.

According to the present invention there is provided a DC to DC converter of the kind specified comprising a controlled relaxation oscillator, a power monostable circuit coupled to said relaxation oscillator so as to be triggered thereby, an energy storage and voltage transformation transformer coupled to said monostable circuit, an output winding of said transformer adapted to be coupled to a load, a sensing winding of of said transformer tightly coupled to the output winding so as to sense the output voltage level, a threshold detector coupled to said sensing winding, the latter serving to transmit the excess energy stored in the transformer to a storage and filtering capacitor coupled to said detector via an amplifier, said amplifier serving to switch said excess energy to said storage and filtering capacitor which is coupled to said relaxation oscillator so as to control its frequency and thereby maintain the output voltage at the required level.

The DC to DC converter, in accordance with the present invention, achieves a good degree of efficiency together with a high degree of stability of the output voltage with respect to variations of load, input voltage and temperature.

Furthermore, the converter can operate within a wide range of input voltages and can operate under conditions of overloading and output short circuiting without damage to the circuit. Under these circumstances it is found that the output voltage returns to its stabilized value as soon as the conditions of overloading or short circuiting are removed.

Several embodiments of a converter in accordance with the present invention will now be described by way of example and with reference to the accompanying drawings, in which.

Figure 1:
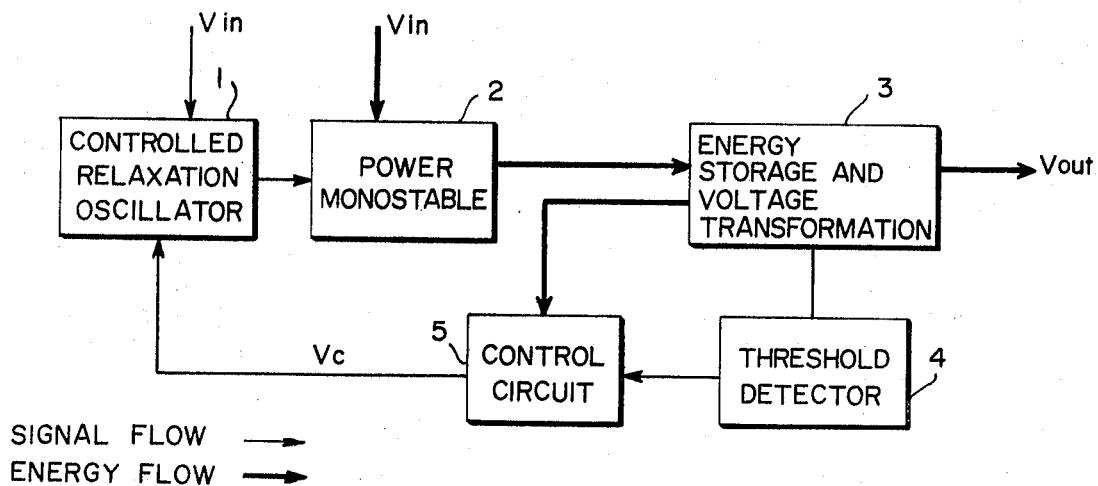
FIG. 1 is a schematic block diagram of the converter.

As seen in FIG. 1 of the drawings, a controlled relaxation oscillator 1 and monostable 2 are provided with a voltage input supply $V$in. An energy storage and voltage transformation unit 3 is fed by the monostable 2 and has a unidirectional voltage output $Vo$, whilst the output of the controlled relaxation oscillator 1 is fed to the input of the monostable 2. The converter is adapted to transform and stabilize this voltage output $Vo$. The energy storage and voltage transformation unit 3 is coupled to a threshold detector 4 and to a control circuit 5. The output of the threshold detector 4 is coupled to the input of the control circuit 5 whilst the output of the control circuit 5 is coupled to the input of the controlled relaxation oscillator 1. This oscillator 1 has its frequency controlled by a voltage $Vc$ transmitted thereto from the control circuit 5. The relaxation oscillator 1 transmits driving pulses to the monostable 2. For each driving pulse which the monostable 2 receives, the latter delivers a fixed amount of energy to the energy storage and voltage transformation unit 3. This stored energy is ultimately delivered from the output of the unit 3 in the form of the voltage $Vo$. Whilst, however, delivering the stored energy as the voltage output, when this voltage reaches or exceeds the predetermined level, the threshold detector 4 is actuated and as a result the excess energy previously stored in the unit 3 is absorbed by the control circuit 5 to generate the control voltage $Vc$. This voltage in turn determines the frequency of the controlled relaxation oscillator 1. The higher the excess energy that is transferred to the control circuit 5, the higher the voltage $Vc$, which in turn reduces the frequency of the oscillator 1 and so the power delivered and vice versa.

Thus, for all load values the oscillator 1 becomes stabilized at that frequency that the output delivered to the energy storage and voltage transformation unit 3 equals the output required by the load at the predetermined output voltage and this in turn stabilizes the output voltage. In such a state of equilibrium, only a very small portion of the pulse energy will be transmitted to the control circuit 5 so as to compensate for its losses in the maintenance of the output voltage $Vo$. Under these circumstances and seeing that the energy losses of the energy storage and voltage transformation unit 3 are essentially fixed and equal for each amount of energy stored, the efficiency of the converter is not a function of the load.

Figure 2:
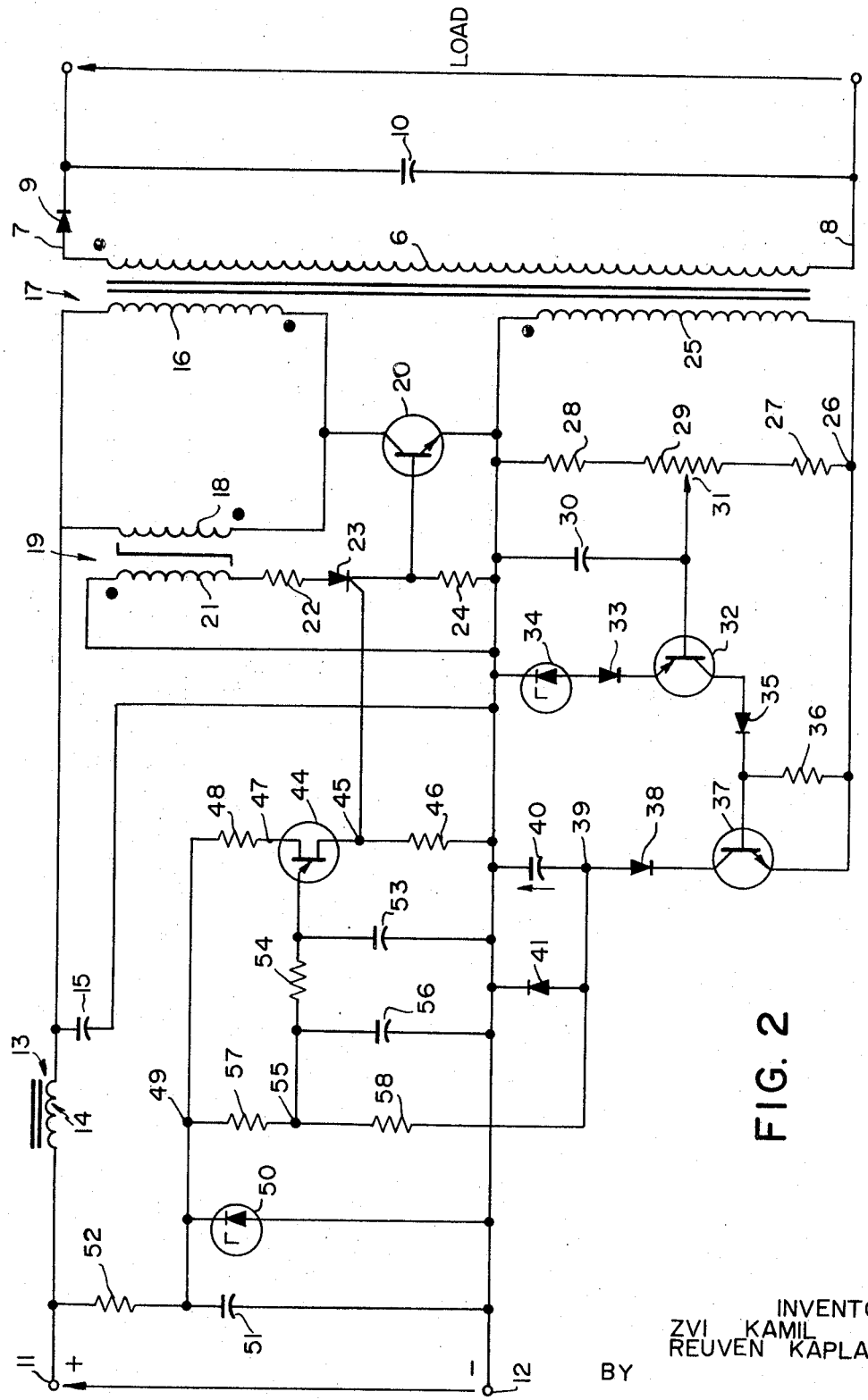
FIG. 2 is a circuit diagram of the converter as a whole.

Reference will now be made to FIG. 2 of the drawings for a detailed description of the construction and operation of the converter. In FIG. 2 of the drawings, a unidirectional voltage input is fed to the converter via input terminals 11 and 12, the positive input terminal 11 being connected via a filter 13 (constituted by a choke 14 and a capacitor 15) to one end of a primary winding 16 of a transformer 17. A secondary output winding 6 of the transformer 17 is connected to a pair of output terminals 7 and 8 which are adapted to be connected via a diode 9 and capacitor 10 to a load.

The winding 16 is connected in parallel with a winding 18 of a transformer 19 which forms part of the feedback circuit of the monostable 2. The transformer 19 is wound on a ferromagnetic core having a square BH loop. The number of turns of the winding 18 and the characteristics of the core of the transformer 19 determine the pulse width of the monostable 2.

An output transistor 20, having a high breakdown voltage, has its emitter connected to the terminal 12 and its collector connected to the other ends of the windings 16 and 18.

The transformer 19 is provided with a further winding 21 (designed to close the feed back circuit of the monostable 2). This winding 21 is connected at one end to the terminal 12 and at the other end, via a resistor 22, to the anode of a thyristor 23, the cathode of which is connected to the base of the transistor 20 which is also connected via a resistor 24 to the common input terminal 12. The provision of the resistor 22 is designed to ensure that the transistor 20 will be saturated during the pulse.

A winding 25 of the transformer 17 constitutes a control winding. One end of this control winding 25 is connected to the common input terminal 12 whilst the other end thereof is indicated by the reference numeral 26. The winding 25 is associated with a voltage divider network constituted by a pair of series connected resistors 27 and 28 and variable resistor 29 connected across the winding 25. A capacitor 30 is connected between the terminal 12 and the slider 31 of the variable resistor 29 and is designed to prevent actuation of the control circuit during the occurence of transient phenomena.

The slider 31 is connected to the base of a transistor 32, the emitter of which is connected to the cathode of a diode 33 whose anode is connected to the anode of a Zener diode 34, the cathode of which is connected to the common input terminal 12. The Zener diode 34 is so chosen that its temperature dependence is compensated by the temperature dependence of the diode 33 and by the base emitter junction of the transistor 32. The unit constituted by the Zener diode 34, diode 33 and transistor 32 constitutes in effect the threshold detector 4 and can be obtained as a commercially available unit.

The collector of the transistor 32 is connected to the anode of a diode 35 whose cathode is connected on the one hand via a resistor 36 to the end 26 of the winding 25 and, on the other hand, to the base of a transistor 37 whose emitter is also connected to the end 26 of the winding 25.

The voltage which appears across the resistor 36 is fixed by the base emitter voltage of the transistor 37. In consequence, a fixed current flows through the resistor 36. Seeing that the base current of the transistor 37 is negligible, effectively the current through the resistor 36 is the current flowing through the transistor 32 and in consequence through the Zener diode 34. The magnitude of the resistor 36 is chosen in accordance with the desired operating point of the Zener diode 34.

The collector electrode of the transistor 37 is connected to the cathode of a diode 38 whose anode is connected to a junction 39. A capacitor 40 and a diode 41 are connected, in parallel, between the junction 39 and the common input terminal 12. The current which is arranged to flow through the transistor 37 charges the capacitor 40 and the voltage thereof in effect controls the frequency of the oscillator. The function of the diode 41 is to prevent charging of the capacitor 40 in a reverse direction in the event of overloading and thereby facilitates return of the circuit to its normal condition when the load returns to its normal state.

During the operation of the control circuit there appears on the winding 25 a voltage which is proportional to the output voltage and this is by virtue of the tight inductive coupling between the winding 25 and the secondary winding 6 of the transformer 17.

The oscillator circuit comprises a unijunction transistor 44 having a base one 45 connected, on the one hand, via a resistor 46 to the common input terminal 12, and, on the other hand, to the gate of the thyristor 23, so as to transmit thereto driving pulses in accordance with the frequency of the oscillator. Base two 47 of the unijunction transistor 44 is connected, via resistor 48 to a junction 49 which is maintained at a stabilized low voltage by a Zener diode 50. The anode of the Zener diode 50 is connected to the junction 49, whilst the cathode is connected to the common input terminal 12. A capacitor 51 is connected, in parallel, with the Zener diode 50 and via a resistor 52 to the positive input terminal 11.

It is possible to replace the resistor 52 by a constant current element and thereby to extend the range of input voltages to the converter.

The emitter of the unijunction transistor 44 is connected via a capacitor 53 to the common input terminal 12. Discharge of the capacitor 53 through the unijunction transistor 44 leads to the creation of the driving pulses for the thyristor 23 and transistor 20. The emitter is furthermore connected, via a resistor 54, to a junction 55, a further capacitor 56 being connected between the junction 55 and the common input terminal 12.

The capacitor 56 and the resistor 54 are provided to stabilize the operation of the oscillator over a wide range of frequencies but do not influence its frequency.

The junction 55 is connected, on the one hand via a resistor 57 to the junction 49 and via a resistor 58 to the junction 39, at which point there is received the control voltage which controls the frequency of the oscillator.

The triggering of the power monostable is derived from the base one 45 of the unijunction transistor 44 and when this trigger appears at the gate of the thyristor 23 it leads to conduction therethrough and consequent saturation of the transistor 20. This driving pulse is relatively narrow, but, as a result of positive feedback, by means of the transformer 19, the transistor 20 remains saturated for a period of time determined by the characteristics of the transformer 19.

The feedback circuit operates as follows: The voltage developed between the emitter and collector of the transistor 20 is the saturation voltage of this transistor 20 and in consequence the voltage which appears across the windings 16 and 18 is substantially equal to the input potential $V$in. A voltage, determined by the winding ratio $N_{21}/N_{18}$ of the windings 21 and 18 is conductively coupled to the winding 21 in such a way that the junction of the winding 21 and resistor 22 is rendered positive with respect to the common input terminal 12, and determines, together with the magnitude of the resistor 22, the current which flows through the thyristor 23 to the base of the transistor 20. This current is sufficiently large to ensure saturation of the transistor 20 during the entire pulse length. The resistor 12 can be replaced by a suitable constant current device.

The pulse width is determined, by the magnitude of the input voltage $V$in and by the characteristics of the transformer 19. As indicated above, the ferromagnetic core of the transformer 19 has a square BH characteristic loop. It will be seen below that, at the initiation of the pulse, the flux in the core is given by $-\Phi$ max. Seeing that the voltage $V$ across the winding 18 is fixed and approximately equal to the input voltage $V$,in so that $$V_{in.} \approx V = N_{18}\frac{d\theta}{dt}$$

the flux in the core will increase at a fixed rate and will, after a time $t$, reach the value $+\Phi$ max. In consequence $$V_{in.} = N_{18}\frac{2\theta \text{ max.}}{t}$$

when $\Phi$ becomes $\Phi$ max. as a result of the saturation of the core of the transformer 19, the positive feedback will be interrupted and the pulse will be terminated. In other words, $t$, the pulse width, is dependent on the one hand on $\Phi$ max. and $N_{18}$ which are fixed and on the other hand on $V$in. The voltage which appears across the winding 16 is transferred to the windings 6 and 25 in accordance with the turns ratios of these windings 6 and 25 and the winding 16 respectively. The presence of the diodes 9, 33, 35 and 38, however, prevent the flow of current in the windings 25 and 6. In consequence there is developed in the winding 16 a current which increases linearly with time and which charges the core of the transformer 17 with energy which is proportional to the inductance (L) of the winding 16 and to the square of the maximum current (I) in the winding 16 at the termination of the pulse (according to the relationship $E=\frac{1}{2}LI^2$). This current is dependent on the input voltage on the winding 16 and on time in accordance with the following relationship:

$$I = \frac{V_{in.}}{L} \cdot t$$

whilst the time is given by the following relationship:

$$t = N_{18}\frac{2\theta \text{ max.}}{V_{in.}}$$

so $$I = \frac{N_{18}}{L} 2\theta \text{ max.}$$

It follows therefore that the quantity of energy which is delivered to the transformer 19 is not dependent on the input voltage. This fact facilitates the obtaining of excellent stabilization of the output voltage as a function of the input voltage over a wide range.

With the termination of the pulse, a reverse voltage is developed on the windings 16 and 18 and in consequence also on the winding 6 in such a manner that the energy which was stored in the core of the transformer 17 is discharged into the capacitor 10. During the entire time of transfer of energy there appears across the windings 16 and 18 a voltage which renders the collector of the transistor 20 positive with respect to the input terminal 11. This voltage is proportional to the output voltage and to the turns ratio $N_{16}/N_{42}$ of the windings 16 and 6. This voltage must, however, be less than the breakdown voltage of the transistor 20.

The use of a transistor 20, having a high breakdown voltage facilitates a reduction of the turns ratio $N_6/N_{16}$ and thereby reduces the difficulties of winding a transformer for high voltage.

The voltage which appears across the winding 18 during the discharge of the energy is of opposite polarity to the voltage which appeared on this winding during the storage of the energy and thereby gives rise to an oppositely directed flux in the core of the transformer 17 until the flux reaches $-\Phi$ max.

In addition, the voltage appears across the winding 21 in a magnitude which depends on the turns ratio $N_{21}/N_{18}$, and, as a result, the anode of the thyristor 23 is rendered negative with respect to the common input terminal 12. This negative voltage turns off the thyristor 23. In consequence the thyristor 23 serves to protect the base junction of the transistor 20 from this negative voltage. The thyristor 23 also prevents the actuation of the power monostable by the oscillations which appear across the windings at the end of the energy transfer and which are due to the stray capacitance of the winding 6.

The discrimination level of the threshold detector is determined, in part, by the voltage of the Zener diode 34 and the voltage divider 27, 28 and 29. The threshold voltage is that voltage which appears between the junction 26 and the common input terminal 12 and which starts conduction of the transistor 32. During the transfer of energy there appears across the winding 25 a voltage such that the junction 26 is rendered negative with respect to the common input terminal 12. This voltage is proportional to the voltage which appears across the capacitor 10 in accordance with the turns ratio $N_{25}/N_6$.

As a result of the transfer of energy to the capacitance 10, the voltage thereon rises and this rise is, in fact, the ripple voltage at the output. The value which the voltage on the capacitor 10 ultimately reaches is determined by the threshold detector in the following manner: when the voltage reaches a value equivalent to the threshold level, any additional differential rise is transmitted to the slider 31 and gives rise to an increase in the current flowing through the transistor 32. Seeing that the current flowing through the resistor 36 is fixed, in view of the fact that the voltage thereacross is fixed and equal to the emitter base voltage of the transistor 37 any rise in the current flowing through the transistor 32 is transmitted to the base of the transistor 37. The collector current of the transistor 37 causes a discharge of the excess energy from the transformer 17 and in this way there is prevented an increase in the voltage across the capacitor 10. The excess energy which has been discharged from the transformer 17 is transferred to the capacitance 40. The voltage across the capacitance 40, which, at the junction 39 is negative with respect to the common input terminal 12, controls the frequency of the oscillator in such a manner that the rate of supply of energy will equal the amount required by the load. Under these circumstances a small proportion of the pulse energy will always actuate the threshold detector and be transferred to the control circuit, this small portion will ensure the maintenance of the voltage $Vc$.

By increasing the gain provided by the transistor 37 (for example by addition of a further transistor or the like), it is possible to reduce the current variation required by the transistor 32 in order to achieve the same variation in the potential $Vc$. A reduction in the variation of the current through the transistor 32 will considerably improve the stability of the output voltage as a function of the load.

The frequency of the relaxation oscillator is determined by the frequency of charging and discharging of the capacitor 53. When the voltage of the capacitor 53 reaches the triggering level of the transistor 44, the latter is switched on and the discharge current of the capacitor 53 flows to base one 45 of the transistor 44 and actuates the power monostable.

The charging of the capacitor 53 takes place as follows: seeing that the capacitance of the capacitor 56 is greater than that of the capacitor 53 and the resistance 54 prevents discharge of the capacitance 56 during the switching of the unijunction transistor 44, the voltage across the capacitance 56 is substantially fixed. In consequence a substantially constant current will flow through the resistance 57. The voltage across the resistor 58 is proportional to the voltage $Vc$ and so is, in consequence, the current therethrough. The difference between these currents, which is a current proportional to $Vc$, charges the capacitance 53. Seeing that for every load there is a corresponding voltage $Vc$, the capacitance 53 will be charged, for every load value, with a corresponding fixed current and this improves the stability of the oscillator and allows a wide range of frequencies.

If we assume that for a particular load the oscillator frequency is higher than required, then during the time interval between two adjacent pulses, the capacitance 10 will discharge through the load by an amount which is less than normal. During the transfer of energy, and when the capacitance 10 reaches the equivalent threshold level, there will remain in the transformer 17 more energy than normal and this will be transferred to the capacitance 40. There will, in consequence, develop a change in the voltage of the capacitance 40 in that the junction 39 will be more negative. In consequence the current flowing through the resistance 58 will rise whilst the current flowing to the capacitance 53 will be reduced. This will in turn lead to a reduction in the rate of charging and a reduction of frequency to that required by the load and vice versa.

The efficiency of the circuit just described depends mainly on the transformer core materials and the manner in which it is used, which is independent of load. A certain decrease in efficiency takes place with decreasing load because there are small fixed losses in the converter circuit caused by the current requirements of the oscillator.

The variation of the output voltage with temperature are mainly caused by the changes in the discrimination level of the threshold detector with temperature. By suitable compensation it is, however, possible to achieve any desired temperature coefficient.

All load magnitudes are associated with corresponding values of the oscillator frequency and, in consequence, on the control voltage $Vc$. The magnitude of the voltage $Vc$ is, in turn, dependent, for each particular load value, on the amount of excess energy. The wide range of this energy which corresponds to changes in the load, needs different output signals from the threshold detector for their absorption in the control circuit. The change of the output signal from the threshold detector causes some variation in the discrimination level. These changes can be minimized as desired by suitable gain in the control circuit.

The dependence of the output voltage on the magnitude of the input voltage arises directly out of the dependence of the magnitude of the stored energy on the input voltage. A variation in the magnitude of the stored energy causes an appropriate change in the frequency and a variation in the output voltage ripple. These two factors together result in a variation in the mean output voltage. The magnitude of the stored energy is substantially independent of the input voltage and so the dependency of the output voltage on the input voltage is substantially small.

In the event of overloading, the oscillator will operate at its maximum frequency and in consequence a fixed amount of power will be transferred to the output and therefore the output voltage will depend on the load resistance. In the event of a short circuit at the output, then, as a consequence of the characteristics of the transformer chosen, the system will consume a small amount of energy.

The response time of the system and its stability are dependent on the magnitude of the capacitors 40 and 10 and the relationship between them. By suitably choosing these components it is possible to obtain the required response. For optimal performance, as far as the response time and change in output voltage is concerned, the response time is of the order of several tens of the relaxation oscillation period.

To illustrate the performance of the converter the following characteristics are given by way of example:

A change of $V$in of ±30percent leads to a change $V$out ±0.02 percent

A change of Temp. of ±50° C leads to a change $V$out ±0.03 percent

A change of load of ±50 percent P nom. to a change $V$out ±0.02 percent

Figure 3:
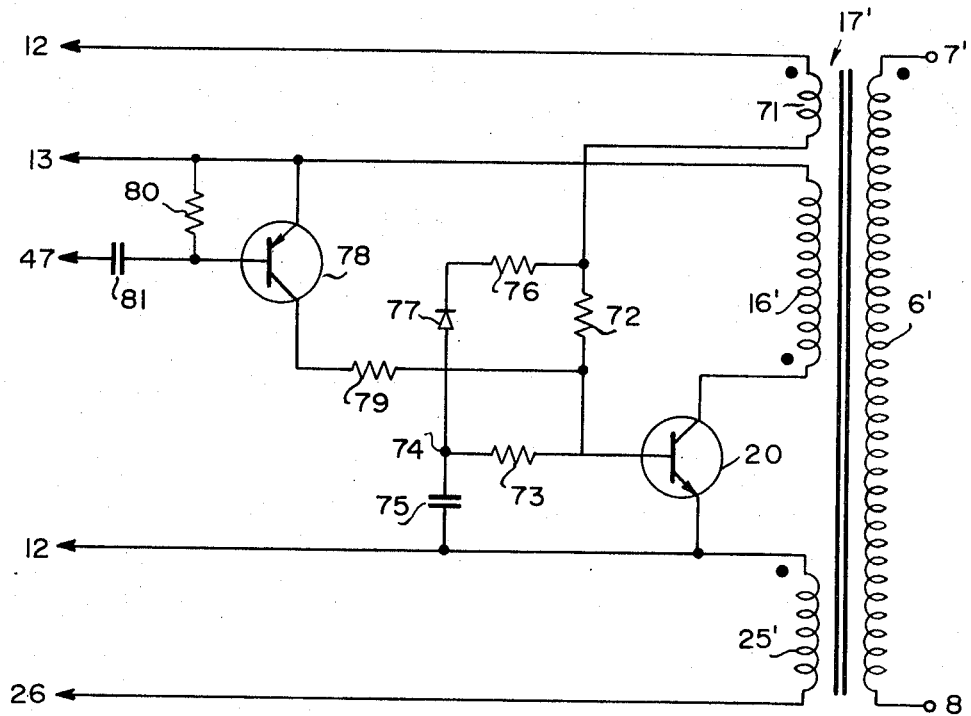
FIGS. 3, 4 and 5 are circuit diagrams showing respective modifications of the circuit shown in FIG. 2.

In a modification of the circuit just described and which is schematically shown in FIG. 3 of the drawings, a transformer 17' which, as before, is provided with an output winding 6', and input winding 16' and a sensing winding 25'. In this embodiment, however, the square hysteresis loop transformer 19 is dispensed with and there is provided a regenerative feedback winding 71 which is connected between the common input terminal 12 and, via a resistor 72, to the base of the output transistor 20. The base of the transistor 20 is also coupled via a resistor 73 to a junction 74, a capacitor 75 being connected between the junction 74 and the common input terminal 12. The end of the regenerative winding connected to the resistor 72 is also connected, via a resistor 76, and diode 77, to the junction 74.

A transistor amplifier 78 has its collector connected via a resistor 79 to the base of the output transistor 20 and its emitter to the junction 13, a resistor 80 is connected between said junction 13 and the base of the transistor amplifier 78. The base is connected, via a capacitor 81, to the base two 47 of the unijunction transistor 44. The circuit shown in FIG. 3 is connected to the remainder of the circuit shown in FIG. 2 in the manner indicated in the drawing.

In effect the circuit shown in FIG. 3 represents a transformer-coupled, triggered blocking oscillator which replaces the power monostable circuit shown in FIG. 2. The arrival at the base of the transistor amplifier 78, via the capacitor 81, of the output pulse from the unijunction transistor 44 results in the triggering of the blocking oscillator. The network (consisting of resistors 72, 73 and 76, diode 77 and capacitor 75) which serves to couple the base of the output transistor 20 and the regenerative winding 71 determines the amount of stored energy and eliminates free or spurious oscillations of the blocking oscillator which could arise as a result of energy stored in the stray capacitance of the windings. This modification is advantageous in that it avoids the square hysteresis loop transformer but, on the other hand, does not exhibit the excellent degree of stability vis-a-vis voltage changes.

Figure 4:
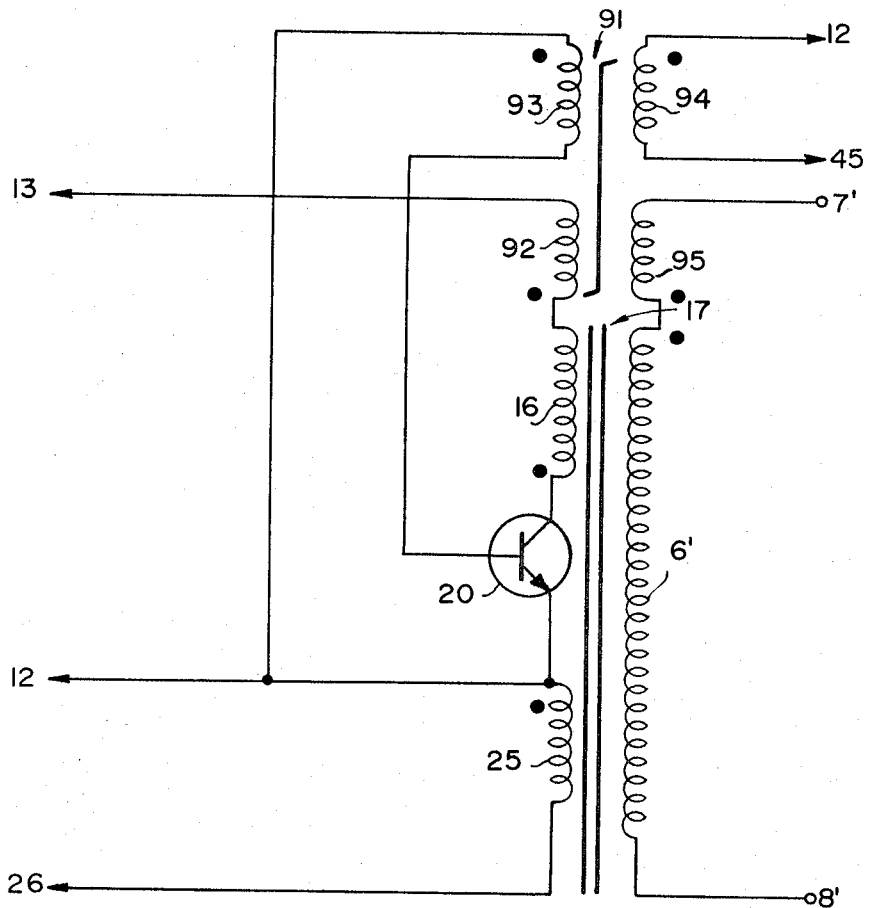

In the modification of the main circuit shown in FIG. 4 the square hysteresis loop transformer 19 is dispensed with and in its place there is provided a regenerative feedback transformer 91 having a square hysteresis loop core. The transformer 91 is provided with a primary winding 92, connected in series with the main winding 16 of the transformer 17, a regenerative winding 93, connected between the base of the output transistor 20 and the common input terminal 12, a triggering winding 94, connected between the common input terminal 12 and base one 45 of the unijunction transistor 44 and finally a recovery winding 95 connected in series with the main output winding 6 of the transformer 17. With this modification it is possible to operate simply and with high efficiency at quite low voltages.

Figure 5:
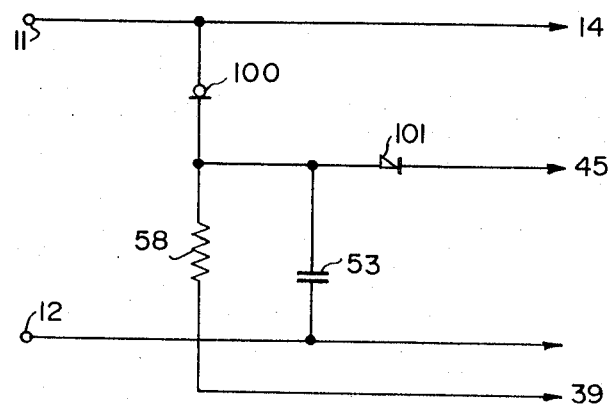

In a further modification of the main circuit, shown in FIG. 5, the unijunction transistor 44, shown in FIG. 2, is replaced by a four layer diode 101 or by another appropriate circuit element which has the characteristic of exhibiting breakdown when the voltage applied thereto exceeds a predetermined value in which case the voltage drops to a minimum. Furthermore, the fixed voltage source which, in the embodiment shown in FIG. 2, comprised the resistor 52, capacitor 51 and Zener diode 50 and resistor 57, is replaced by a field effect current regulator diode 100. The filter network shown in FIG. 2 and comprising the resistor 54 and capacitor 56 are now completely omitted in the embodiment shown in FIG. 5. This embodiment has the advantage that it is relatively nonsensitive to wide input voltage variations and consists of relatively few components.

In all the embodiments described above the threshold detector and associated amplifier are fed with the excess energy of the storage and conversion transformer. This energy is always absorbed at the fixed threshold level and in consequence these circuits are supplied by a regulated source independent of input voltage and load variations.

In all cases the unijunction transistor, employed in the circuits described above, can be replaced by a P.U.T. (Programmable unijunction transistor).

We claim:
1. A DC to DC converter for use in the voltage transformation and regulation of a unidirectional voltage comprising:
   a. a controlled relaxation oscillator;
   b. a power monostable circuit;
   c. circuit means connecting the power monostable circuit to the relaxation oscillator so as to be triggered thereby;
   d. an energy storage and voltage transformation transformer;
   e. circuit means connecting the transformer to the monostable circuit;
   f. a rectifier;
   g. a capacitor;
   h. said transformer including an output winding;
   i. circuit means connecting said output winding to a load in series with said rectifier;
   j. said capacitor being connected in parallel with the load;
   k. said transformer including a sensing winding;
   l. circuit means tightly coupling the sensing winding to the output winding so as to sense the output voltage level;
   m. a threshold detector;
   n. circuit means coupling the threshold detector to the sensing winding;
   o. a storage and filtering capacitor;
   p. an amplifier;
   q. circuit means coupling said storage and filtering capacitor to said detector via said amplifier so as to switch excess energy stored in the transformer to the storage and filtering capacitor; and
   r. circuit means coupling said storage and filtering capacitor to said relaxation oscillator so as to control its frequency and thereby to maintain the output voltage at a required level.

2. A DC to DC converter according to claim 1, wherein said threshold detector comprises a temperature compensated network including a Zener diode, a compensating diode and an amplifying transistor coupled to said amplifier.

3. A DC to DC converter according to claim 2, wherein said amplifier is coupled to said temperature compensated network so as to reduce current changes passing therethrough and caused by variations in the input voltage and load.

4. A DC to DC converter according to claim 1, wherein said controlled relaxation oscillator comprises a unijunction transistor, a resistance network connected between a fixed voltage point and said storage and filtering capacitor, the emitter of said unijunction transistor being coupled via a filtering network to a tapping on said resistance network and via a capacitance to a common input terminal.

5. A DC to DC converter according to claim 4, wherein the unijunction transistor is programmable.

6. A DC to DC converter according to claim 1, wherein said control relaxation oscillator comprises a constant current source connected between an input terminal and the anode of a four layer diode or element of similar characteristics, said anode being connected via a resistor to said storage and filtering capacitor and via a timing capacitor to a common input terminal, the cathode of said four layer diode being coupled to said power monostable.

7. A DC to DC converter according to claim 1, wherein said monostable comprises an output transistor, a swinging choke transformer, whose main winding is connected between the collector of the output transistor and an input DC line, there being furthermore provided a second transformer having a square hysteresis loop core, a main winding connected between said collector and the input DC line and a regenerative feedback winding which is coupled to the base of the output transistor via a thyristor and a constant current device.

8. A DC to DC converter according to claim 7, wherein the constant current device is a resistor.

9. A DC to DC converter according to claim 1, wherein said power monostable comprises an output transistor, a swinging choke transformer whose main winding is connected in series with a primary winding of a regenerative feedback transformer having a square hysteresis loop core between the collector of the output transistor and an input DC line, a regenerative winding of said regenerative feedback transformer being connected between the base of the output transistor and a common input line, a triggering winding and a recovery winding in series with the output winding.

10. A DC to DC converter according to claim 1, wherein said monostable comprises a transformer-coupled triggered blocking oscillator and wherein said transformer is provided with a main winding connected between the collector of the output transistor and an input DC line, said output and voltage sensing winding and a regenerative winding coupled between said common input line and the base of the output transistor.